(12) United States Patent
Hilsenrath

(10) Patent No.: US 6,657,989 B1
(45) Date of Patent: Dec. 2, 2003

(54) APPARATUS AND METHOD FOR ROUTING COMMUNICATIONS

(75) Inventor: Michael Hilsenrath, Elstree (GB)

(73) Assignee: Interoute Communications Limited, London (GB)

(*) Notice: Subject to any disclaimer, the term of this patent is extended or adjusted under 35 U.S.C. 154(b) by 0 days.

(21) Appl. No.: 09/331,182

(22) PCT Filed: Jul. 17, 1998

(86) PCT No.: PCT/GB98/02127
§ 371 (c)(1),
(2), (4) Date: Aug. 13, 1999

(87) PCT Pub. No.: WO99/04578
PCT Pub. Date: Jan. 28, 1999

(30) Foreign Application Priority Data

Jul. 18, 1997 (GB) .............................................. 9715277

(51) Int. Cl.[7] .............................................. H04L 12/56
(52) U.S. Cl. ........................................ 370/351; 370/354
(58) Field of Search ................................ 370/354, 389, 370/395.1, 351, 357, 386; 379/355.08

(56) References Cited

U.S. PATENT DOCUMENTS

| | | | |
|---|---|---|---|
| 5,504,743 A | * | 4/1996 | Defendstedt |
| 5,638,433 A | | 6/1997 | Bubien, Jr. et al. |
| 5,764,741 A | | 6/1998 | Barak |
| 5,917,897 A | | 6/1999 | Johnson et al. |
| 6,011,795 A | * | 1/2000 | Varghese et al. ............ 370/392 |
| 6,466,985 B1 | * | 10/2002 | Goyal et al. ................. 709/238 |

FOREIGN PATENT DOCUMENTS

| | | |
|---|---|---|
| AU | 34289/95 | 5/1996 |
| EP | 0 676 888 | 10/1995 |
| EP | 0 724 371 | 7/1996 |
| GB | 2 298 335 | 8/1996 |
| WO | WO 98/21865 | 5/1998 |
| WO | WO 98/32288 | 7/1998 |

* cited by examiner

Primary Examiner—Kenneth Vanderpuye
(74) Attorney, Agent, or Firm—Oblon, Spivak, McClelland, Maier & Neustadt, P.C.

(57) ABSTRACT

A routing device is used to route telephone calls. The device prefixes user generated call numbers with a prefix code which determines the network connection route and provides billing and customer identification information. The device determines the preferred route by addressing a lookup table which is periodically updated with updating information transmitted by radio broadcast from a control center. The device may be a standalone device connected through a telephone in a local exchange connection or may be formed unitarily with a telephone facsimile machine or a mobile telephone. The broadcast updating information is transmitted by a message pager transmitting system during off peak message handling times. The device is provided with two memory areas for first and second lookup tables so that one of the tables remains addressable while the other table is being updated. The most recently updated table being subsequently used as the decision table.

30 Claims, 12 Drawing Sheets

APPARATUS AND METHOD FOR ROUTING COMMUNICATIONS

BACKGROUND OF THE INVENTION

1. Field of the Invention

The present invention relates to an apparatus and method for communicating between two communication terminals and is particularly concerned with an apparatus and method for routing communication between the two terminals along a preferential route.

2. Discussion of the Background

In recent years many countries have liberalised their telecommunications systems. As a result, when a user operates a telephone, the user increasingly has a choice as to the network(s) used to carry his message. Each network has typically a different set of characteristics such as geographical extent, speed of transmission, and an associated cost.

Devices are known which automatically route messages along the route of least cost. As the route costings of the networks change, the routing information stored in these devices need to be updated as the least cost route may have changed. This updating is done by sending updated information along the telephone lines to the least cost route device.

A problem with known devices for least cost routing is that each device must be individually updated and hence a large amount of information is transmitted along the telephone lines.

It is known from U.S. Pat. No. 5,606,602 to broadcast by a radio signal bid information relating to a number of competing carriers to user terminals in a telephone system. Such terminals are provided with a processor enabling a decision to be made as to the least cost route based on the costing information received.

A disadvantage of such a system is that it requires intelligent processing at the terminal and also that commercially sensitive cost data may be broadcast.

SUMMARY OF THE INVENTION

According to the present invention there is disclosed an apparatus for routing telephone calls comprising; input means operable to receive an input signal representative of a user generated call number defining a user selected call destination; signal generating means operable to prefix the input signal with a prefix signal representative of a selected prefix code defining at least a network connection route selected from a plurality of available routes to the user selected call destination; memory means operable to store a decision table containing predetermined data for determining prefix codes corresponding to a plurality of respective call destinations; selecting means operable to obtain said selected prefix code corresponding to said user selected call destination by addressing the memory means; output means operable to output an output signal corresponding to the input signal prefixed by the prefix signal; receiving means operable to receive a wireless broadcast signal of updating information, and updating means operable to update the predetermined data stored in the decision table in accordance with the received updating information.

In embodiments of the present invention a large number of routing devices incorporating such apparatus may be updated simultaneously as, since the same information is required by many devices, all the devices within range of the transmitter of the information carried by free-space electromagnetic waves may pick up the broadcast information.

In accordance with a further aspect of the present invention there is provided a control centre for collating updating information and sending it to a transmitter to be broadcast to a number of routing devices. The control centre may send different updating information to the radio transmitters covering different geographical areas as the preferential route may change between the areas served by different transmitters.

Preferably the updating information is transmitted by a network of radio transmitters currently used for transmitting information to pagers. The updating information may be transmitted at a time when it is cheap to use the network of transmitters for transmitting information to pagers.

In accordance with a further aspect of the present invention, there is provided a telecommunications apparatus such as a telephone, facsimile machine or mobile cellular phone incorporating the above disclosed apparatus.

According to a further aspect of the present invention there is disclosed a method of operating a radio paging system comprising: transmitting radio paging signals by operation of a transmitter to radio pager devices in accordance with user demands for pager messages; identifying an off peak period in which spare capacity exists in the transmitter operation due to fluctuation in user demand; and transmitting telephone call routing information during an off peak period by operation of the transmitter to telephone call routing devices adapted to receive, store and subsequentially use the call routing information.

According to a further aspect of the present invention there is disclosed a method of collecting charging information for calls made via a plurality of telephone network service providers, comprising prefixing each call with a code representative of call management information identifying a charging control centre and a customer identifier; each network service provider collating call charging information for calls connected via their respective network and including the call management information; the service providers transmitting collated call charging information to the charging control centre; and wherein the charging control centre collates said call charging information for subsequent billing of customers corresponding to the customer identifiers.

BRIEF DESCRIPTION OF THE DRAWINGS

Exemplary embodiments of the present invention will now be described with reference to the accompanying drawings in which.

DETAILED DESCRIPTION OF THE PREFERRED EMBODIMENTS

In the following description of preferred embodiments, reference is made to a least cost routing module. Such a module is to be understood to be an example of a routing device in accordance with the present invention and that, although the predetermined information on which the routing device operates will typically be decided on the basis of least cost routing, the information may equally well be determined on the basis of network availability, level of use of networks, or other factors, or continuation of the above, which may be appropriate to particular operating circumstances. It is important to note that the routing device, or least cost routing module, is notionally unaware of the basis on which the routing decision is determined, this determination being conducted remotely therefrom by a control centre.

Figure 1:
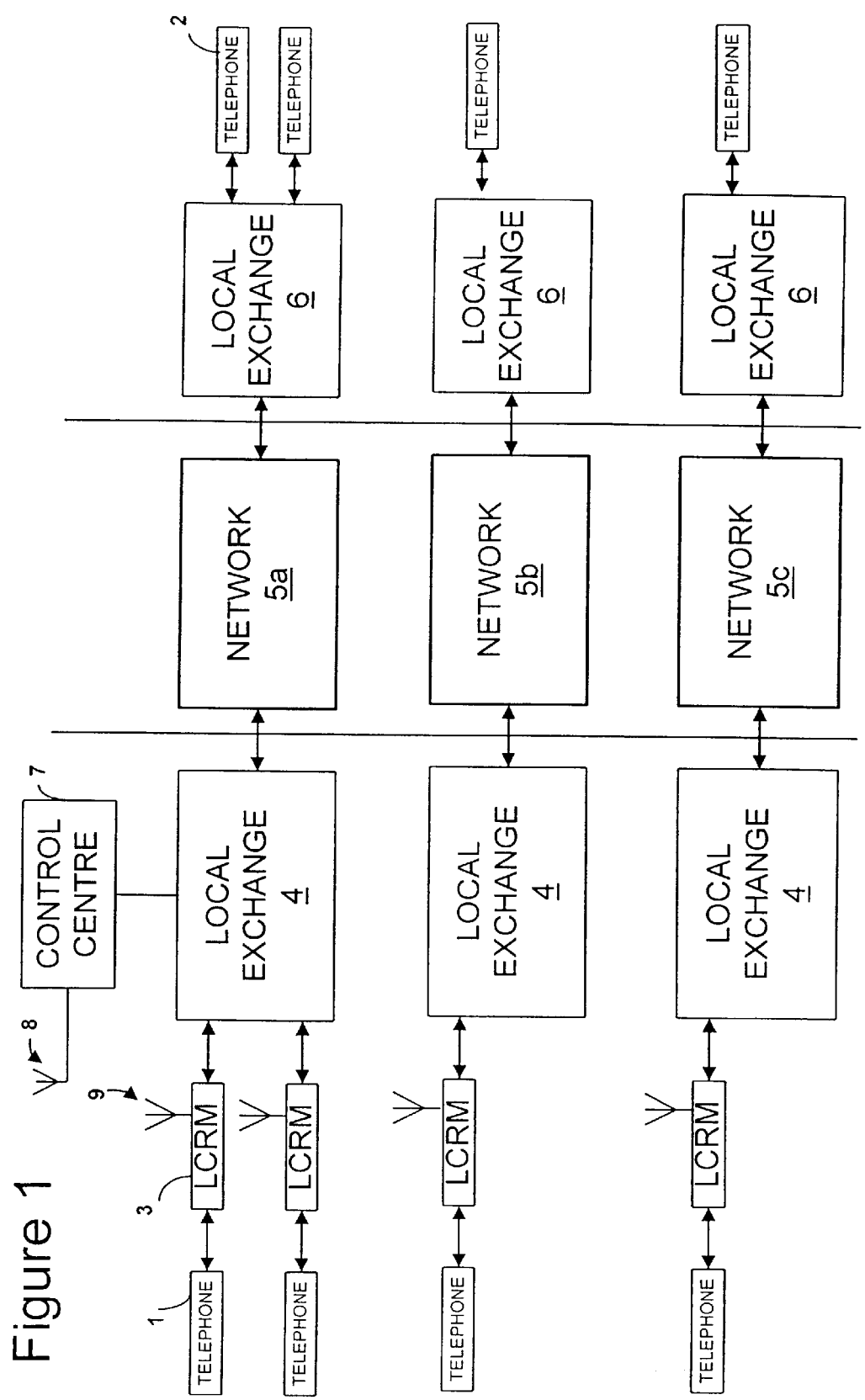
FIG. 1 is a schematic diagram of a communication system of a first embodiment of the present invention.

The communication system shown in FIG. 1 comprises a number of communication networks 5a, 5b, 5c, each of which is connected to a number of local exchanges 4, 6. A number of telephones 1 are each connected to a local exchange 4 via a corresponding routing device referred to hereafter as a least cost routing module (LCRM) 3. A number of telephones 2 are directly connected to each local exchange 6. A control centre 7 is connected to one of the local exchanges 4. The control centre 7 is also connected to a transmitting antenna 8. Each LCRM 3 is provided with a respective receiving antenna 9.

When a caller at a telephone 1 calls a telephone 2 by dialling a telephone number, the dialled number is transmitted using dual-tone multi-frequency (DTMF) dialling to the least cost routing module (LCRM) 3 which determines from a look up table (described below) which of the networks 5a, 5b, 5c provides the preferred connection between the two telephones 1, 2 based on routing information currently stored in the LCRM 3. In the present example, the preferred route is a least cost route.

The LCRM 3 sends dialling information to the local exchange 4, using DTMF dialling, which includes the telephone number of the telephone 2 prefixed by data which includes the access code of the selected least cost route. The local exchange 4 analyses the dialling information sent by the LCRM 3 and routes the call to the telephone 2 along the selected least cost route.

The networks 5a, 5b, 5c may incorporate any means for transmitting information between telephones, for example wires, optical fibres and satellite links. Examples of suitable networks are those provided by telecommunications companies such as British Telecom and AT&T. The Internet is another example of a suitable network.

The service providers of networks 5a, 5b, 5c send billing information, containing details of the caller's telephone number, the called telephone number and the duration of the call, to the control centre 7. The control centre 7 subsequently bills the caller. In this way, rather than receiving separate bills from each of service providers of the networks 5a, 5b, 5c, a caller receives one bill from the control centre 7. The operator of the control centre 7 pays each network service provider for the time used on its network. Such networks may be public or private data networks and may include the internet as described in greater detail below. Such networks may therefore include data networks not originally or primarily intended for carrying voice traffic.

The control centre 7 collates costing information for each of the networks 5a, 5b, 5c to determine the current rates charged by the network service provides for communicating between any two telephones 1, 2, and the least cost route is calculated by the control centre 7 for given time periods. Typically network service providers charge at different rates for different times of the day, there being typically a peak charge time period and an off peak time period, these rates also typically differing according to the day of week. Whenever a change in the cost of using a network occurs, the comparison between the cost of each route must be repeated in order to revise the decision as to which of the available routes is a least cost route. The results of this decision must then be passed on to the LCRMs 3. In order to update the routing information stored in each LCRM 3, data to which the LCRM 3 refers to by addressing a look up table is periodically transmitted by the transmitting antenna 8 to each LCRM 3 using radio waves, the information being received via the respective receiving antenna 9 of each LCRM 3.

The updated least cost route information broadcast by the control centre 7 to each LCRM 3 via the transmitting antenna 8 is preferably encrypted and compressed to form a coded signal and then used to modulate a radio wave.

As an example, a VHF band signal may be utilised, data being encoded in accordance with the POCSAG standard at 2400 bps, using forward error coding of ECH type and interleaving. Such transmissions are presently available by pager transmission systems and it is envisaged that such existing pager transmission systems could be used to transmit updating information to the LCRMs 3 during periods of minimum or off peak pager message traffic.

The information broadcast by the transmitting antenna 8 is detected by each receiving antenna 9 within the geographical area covered by the transmitting antenna 8. The data transmitted via the transmitting antenna 8 may contain address information corresponding to address information stored in the LCRM's 3, the information being arranged to allow the control centre 7 to selectively address all LCRM's, groups of LCRM's or individual LCRM's within the geographical area converted by the transmitting antenna 8. This information is then used to update the routing information stored in the LCRM 3.

Figure 2:
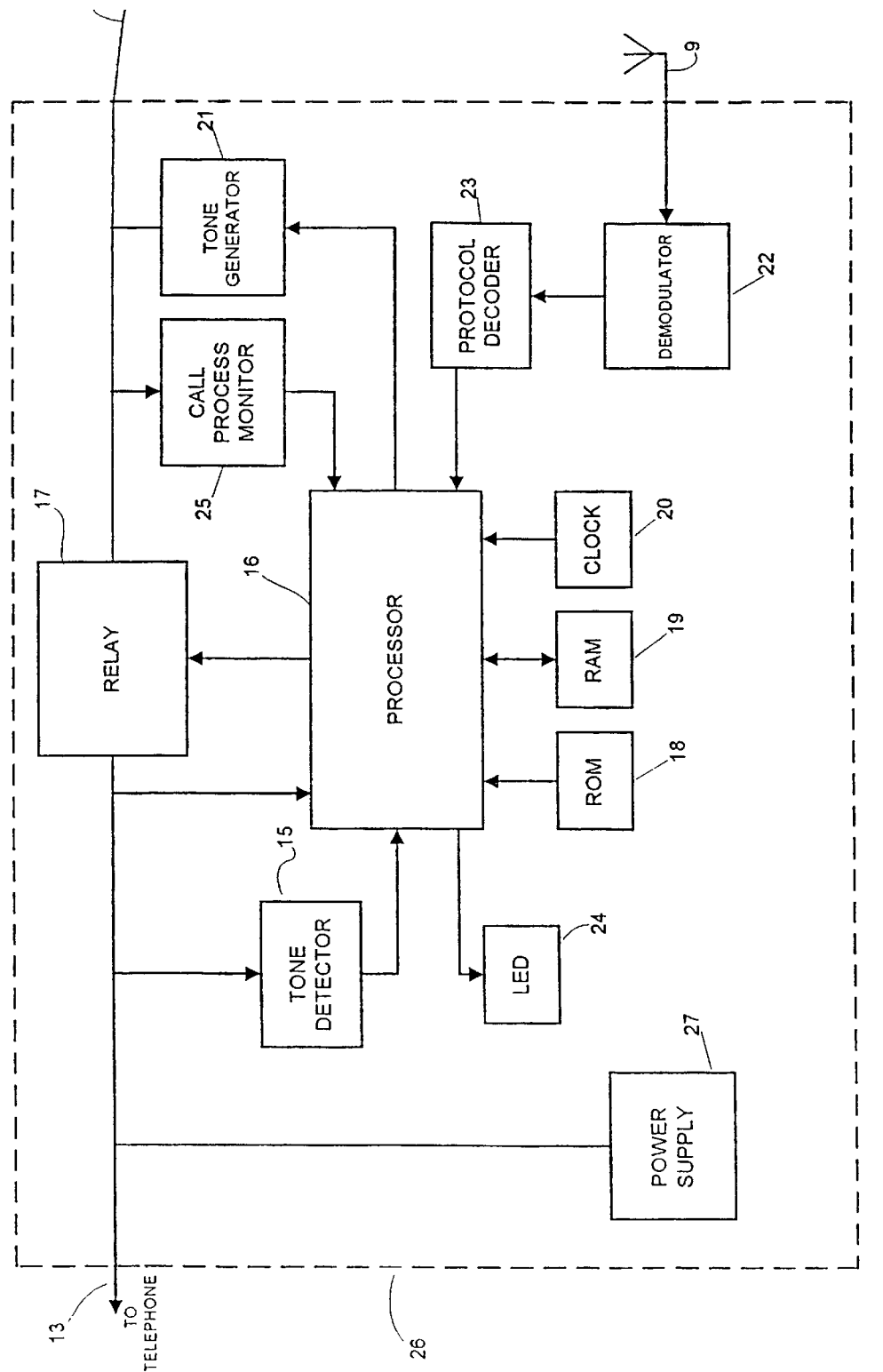
FIG. 2 is a block diagram showing the internal structure of the routing device illustrated in FIG. 1.

With reference to FIG. 2, a "stand alone" version of the LCRM 3 comprises a housing 26 (indicated by dashed lines) which supports a socket 13 for receiving a conventional line connection plug (not shown) of the corresponding telephone 1. The socket 13 is connected via a relay 17 to a lead 14 which terminates in a conventional telephone plug 14a, for connecting the module to a conventional wall telephone socket (not shown) which is connected (in turn) to the local exchange 4.

The relay 17 is normally closed so that signals from the local exchange 4 pass via the plug 14a, lead 14, relay 17 and socket 13 directly to the telephone 1. In this way, the telephone 1 may receive calls without any impediment by the LCRM 3.

In response to initiation of a call from the telephone 1, the relay 17 is temporarily opened under control of a processor 16, thus ensuring that dialling information from the telephone 1 does not go straight to the local exchange 4. While the relay 17 is open, the microprocessor 16 retrieves the least cost route information stored in the RAM 19 based on the user generated call number and the time indicated by the clock 20, and transmits to the local exchange via the lead 14 and the plug 14a a signal which includes both the identity of the required routing for the call and the number called. Thereafter, the relay 17 is closed to permit the telephone call to proceed.

A power supply 27 is connected to the socket 13. The power supply 27 ensures that when the relay 17 is opened the telephone 1 still has a source of power. The power supply 27 may incorporate a battery or may be a mains-powered transformer/rectifier (not shown).

The socket 13 is connected directly to an input of the processor 16 to allow detection of "off hook" status of the telephone. The socket 13 is also connected to the processor via a tone detector 15 thereby allowing the processor to detect a user generated call number. An output of the processor 16 is connected to a tone generator 21 which is connected to the lead 14 thereby allowing the processor to control an output signal to the local exchange. The lead 14 is also connected to a call progress monitor 25 which is in turn connected to an input of the processor 16 to allow the processor to monitor whether the output signal results in successful connection to the user selected call destination.

A further input of the processor 16 is also connected to components allowing updated routing information to be received and stored, including a protocol decoder 23, a read only memory (ROM) 18, a random access memory (RAM) 19 and a clock 20. The protocol decoder 23 is also connected to a demodulator 22 which is connected to the receiving antenna 9. An LED 24 or other indicator device is connected to an output of the processor 16.

The tone detector 15 is a conventional device for detecting the dialled telephone number. The tone generator 21 is a conventional device used to generate the dialling information to be sent to the local exchange 4. The clock 20 is a conventional device which keeps a measure of passing time.

When the receiving antenna 9 detects radio waves transmitted by the transmitting antenna 8, the demodulator 22 demodulates the received RF signal reproducing the coded signal which is then fed to the protocol decoder 23 which identifies if the signal is the updating information and decodes the coded signal. The updating information is then sent to the processor 16.

The LED 24 indicates the update status of the LCRM 3. The LED 24 may be in one of three states. Firstly, when the LED 24 is on it indicates that the LCRM 3 needs to be initialised. Secondly, if the LCRM 3 has been initialised but no updating information has been received in the last 24 hours, or if updating information has been received in the last 24 hours but the data was corrupted, then the LED flashes. Thirdly, if the LCRM 3 has been initialised and updating information has been successfully received and the LCRM 3 has been updated in the last 24 hours, then the LED 24 is off.

The call progress monitor 25 is a conventional device for monitoring signals sent from the networks 5a, 5b, 5c to the telephone 1. The call progress monitor 25 also receives messages sent from the control centre 7 to the LCRM 3 during initialising operation of the LCRM, including for example a registration number of the LCRM and data defining the radio transmission format.

Figure 3:
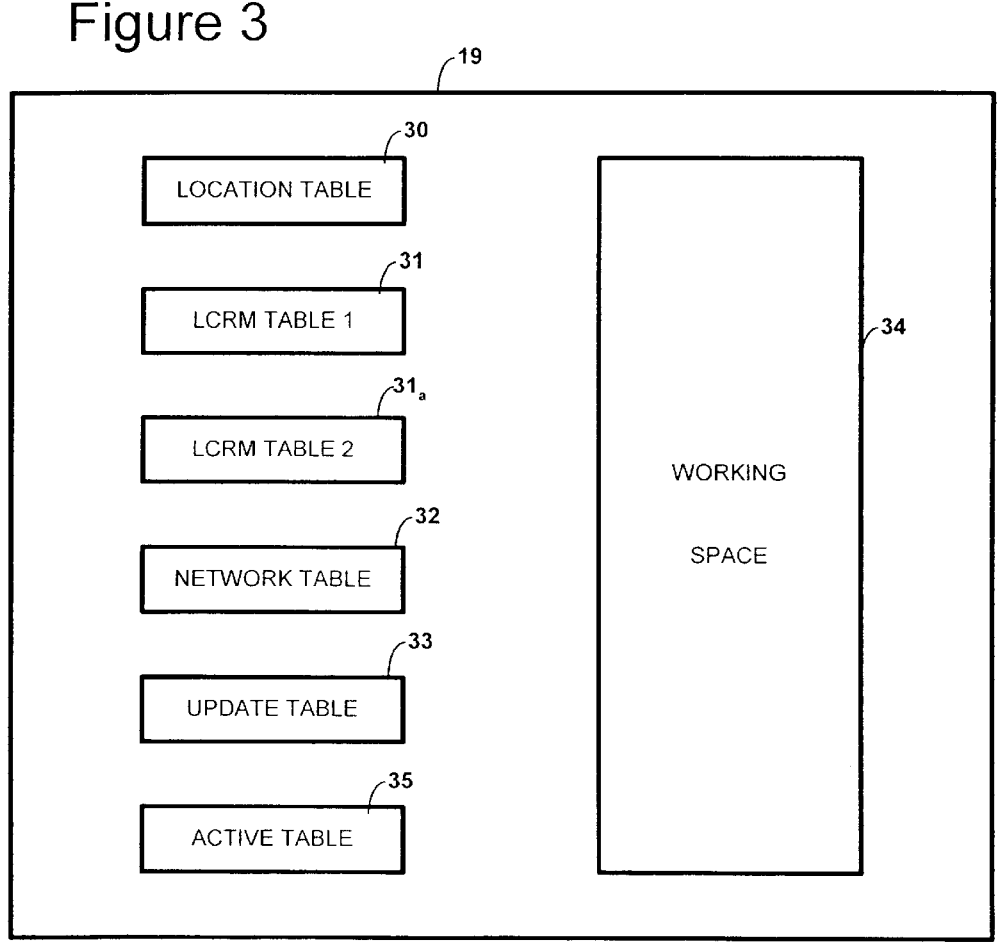
FIG. 3 is a block diagram of the contents of the RAM of the routing device illustrated in FIG. 2.

FIG. 3 is a schematic diagram of the contents of the RAM 19. The LCRM tables 31, 31a indicate least cost routes (network ID) for communicating to call destinations categorised by geographical location (location ID) during each of a number of time periods. At any one time, only one of the LCRM tables 31, 31a is addressable to provide routing information corresponding to a user dialled number. The processor designates which one of the table is to be active, i.e. addressable, and which is to be inactive, on the basis of which table has been most recently updated. Information indicating which of the LCRM tables 31, 31a is active is stored in the active table 35. The purpose of having two LCRM tables 31, 31a is to enable one table to be updated while the other is still available to be addressed for retrieving routing information. Alternatively, a single LRCM table may be provided and updating transmissions arranged to occur at periods when call traffic is lowest, or control circuitry could be provided to suspend operation of the LCRM while updating takes place.

A schematic and simplified representation of part of one of the LCRM tables 31, 31a is shown in Table 1 below:

TABLE 1

|  | $T_1$ | $T_2$ | $T_3$ |
|---|---|---|---|
| ID1 | 5a | 5a | 5a |
| ID2 | 5b | 5a | 5a |
| ID3 | 5c | 5b | 5c |
| ID4 | 5c | 5a | 5b |
| ID5 | 5b | 5b | 5c |

In table 1, the first column contains the location ID for five geographical locations corresponding to user selectable call destinations. The first row contains three time periods $T_1$, $T_2$ and $T_3$. For example, $T_1$ might correspond to the period from 7pm to 8am on weekdays, $T_2$ might correspond to the period from 8am to midday on weekdays, and $T_3$ might correspond to the period from midday to 7pm on weekdays. The network ID for the least cost route to a location at a certain time is stored in the matrix element in the row which contains the location ID for the location and the column which stores the time period containing the certain time. For the purposes of explanation, the network ID is the label referring to the network in FIG. 1.

For example, at any time in the time periods $T_1$, $T_2$ and $T_3$ the network 5a provides the least cost route to a location with location ID "ID1". However, the least cost route to a location with location ID "ID4" is via network 5c during $T_1$, the network 5a during $T_2$ and the network 5b during $T_3$.

The labels for the location ID, time period and network ID in Table 1 have been chosen to aid clarity of explanation. In practice numerical values are used for all the entries in the LCRM tables 31, 31a.

The location table 30 is a look up table enabling the processor to convert a dialled telephone number to a location ID to be used as the row address when addressing the LCRM table. The network table 32 enables the processor to convert the contents of the LCRM table into a prefix code to be added to the user generated dialled number and which is to be output in the output signal to be received by the local exchange.

The update table 33 stores the current update status of the LCRM 3. The working space 34 is used in the running of programs and for buffering information.

Figure 4:
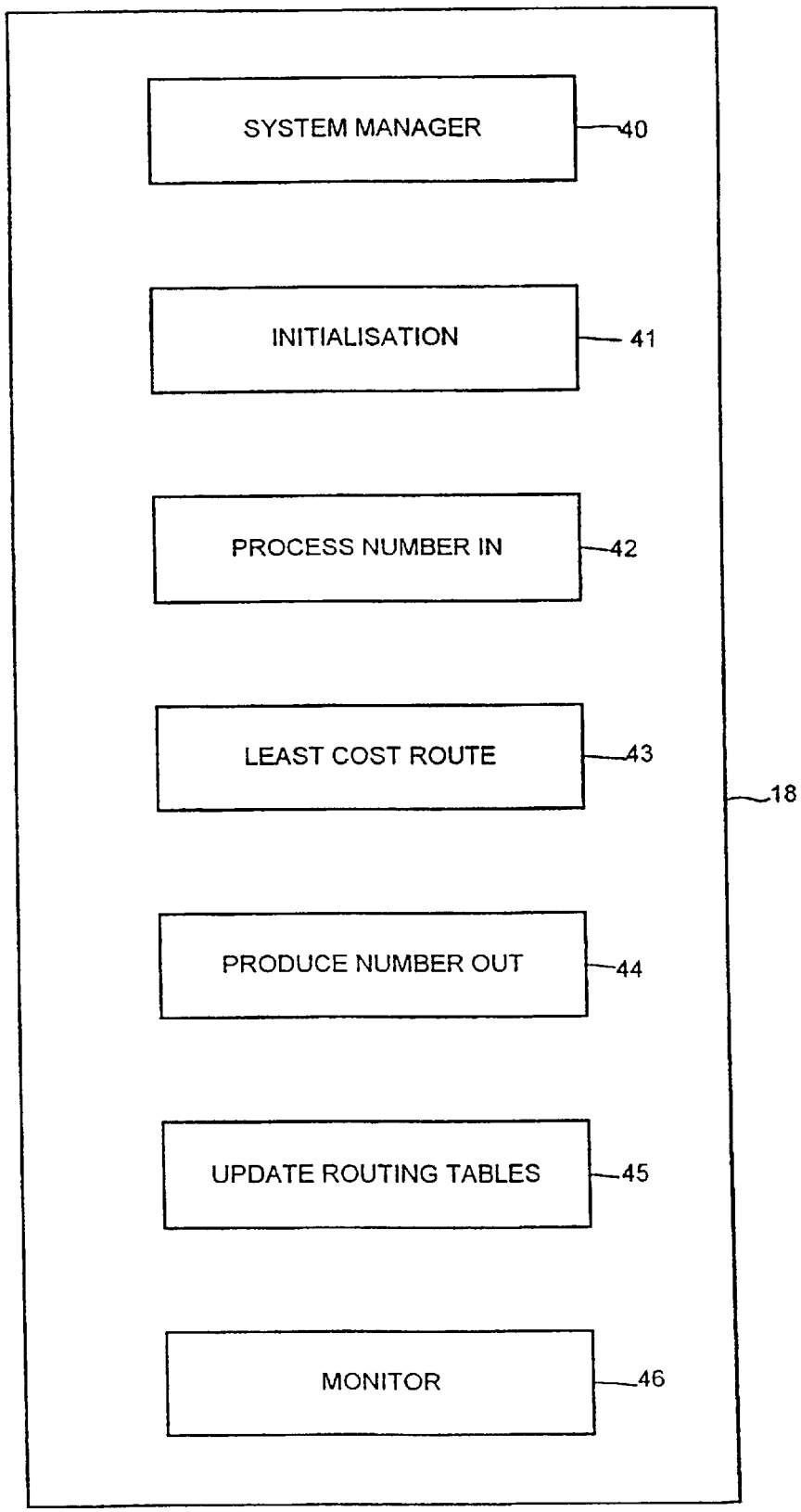
FIG. 4 is a block diagram of the contents of the ROM of the routing device illustrated in FIG. 2.

FIG. 4 is a schematic diagram showing the programs stored in the ROM 18. The system manager 40 controls the LCRM 3 using a number of sub-routines. The initialisation sub-routine 41 is run when the LCRM 3 is first switched on to obtain the registration number of the LCRM 3 and the frequency of the radio waves used for updating the LCRM tables 31, 31a. This information is obtained from the control centre 7 via the local exchange 4 and the call progress monitor 25. The initialisation information may also include information concerning local time, day and date for initially setting the clock 20. Alternatively, the clock may include a display and setting switches (not shown) accessible to the user for manually setting the clock.

The "process number in" 42, "least cost route" 43 and "produce number out" 44 sub-routines are employed when dialling information is received from a telephone 1, and the "monitor" sub-routine 46 is used when a call is being connected to a network.

Figure 5:
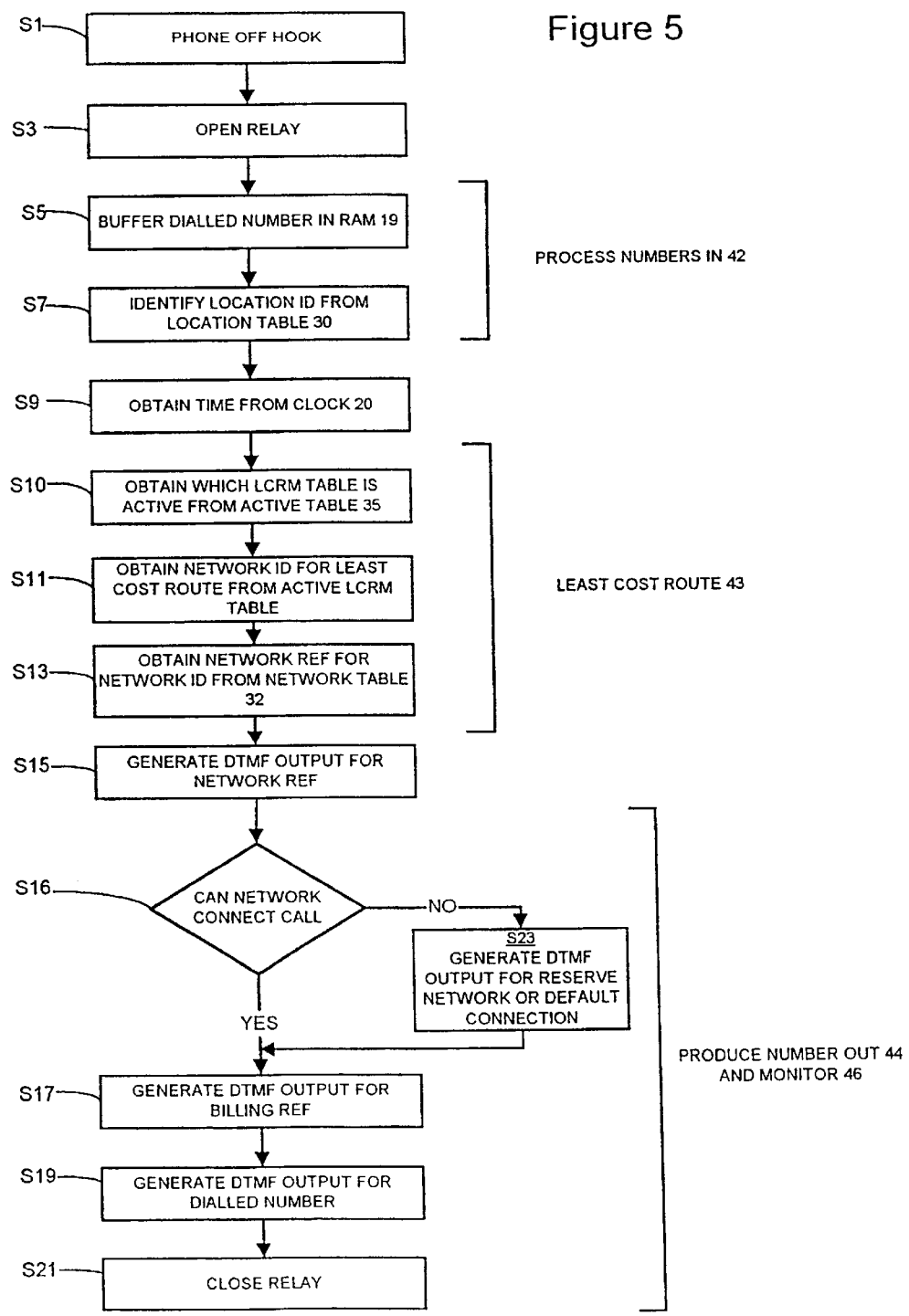
FIG. 5 is a flow chart indicating the sequence of operations when an user operates a telephone attached to the routing device illustrated in FIG. 2.

The sequence of events when a number is dialled at the telephone 1 is shown in FIG. 5. At step S1 the processor 16 detects electric current flowing between the telephone 1 and the local exchange 4 which indicates that the telephone has been taken off-hook by a caller and at step S3 the processor 16 sends a signal to open the relay 17. The "process number in" sub-routine 42 is then activated. The dialled number is buffered in the RAM 19 in step S5. The dialled number is then analysed and the location ID is obtained from the location table 30 in step S7.

Next, in step S9 information about the current time is obtained using the clock 20. The "least cost route" sub-routine 43 is run to look up in the active table 35 which of the LCRM tables 31, 31a is currently active (step S10) and to obtain the network ID for the least cost route from whichever of the LCRM tables 31, 31a is currently active at step S11. A reserve network ID corresponding to a "second best" choice may also be retrieved from the LCRM table 31 or 31a, for use in the event that the lowest cost network is unavailable. In step S13 the network references corresponding to the network IDs are obtained from the network table 32.

The "produce number out" sub-routine 44 is then run to signal the tone generator 21 to generate DTMF output for the network reference at step S15. The "monitor" sub-routine 46 is then run to monitor the line from the local exchange 4 with the call progress monitor 25 for a signal from the network whose network reference has been transmitted indicating whether the network can connect the call (step S16). If the network can connect the call then the "produce number out" sub-routine 44 is activated to signal the tone generator 21 to generate DTMF output for a billing reference (step S17) and DTMF output for the dialled number (step S19). If the network cannot connect the call then the "produce number out" sub-routine 44 is run to signal the tone generator to generate DTMF output for the network reference of a reserve network (step S23). This may for example be a predetermined code identifying the local loop operator to which the terminal is connected for providing the default network connection route. Information defining the identity of the local loop operator is communicated to the processor during initialisation of the LCRM. DTMF output for a billing reference (step S17) and DTMF output for the dialled number (step S19) is then generated. Subsequently at step S21 a signal is sent from the processor 16 to switch the relay 17 to connect the telephone 1 directly to the local exchange 4.

In principle the dialling information sent from the LCRM 3 to the local exchange 4 can be in one of many formats.

Figure 6:
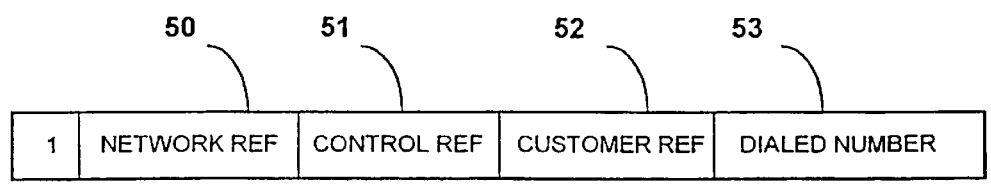
FIG. 6 is a schematic diagram of the dialling information sent from the routing device illustrated in FIG. 2.

FIG. 6 illustrates a schematic diagram of the dialling information sent from an LCRM 3 to a local exchange 4 in this embodiment.

The dialling information conforms to the 1xxx standard whereby the first digit sent is 1 followed by a number which indicates the network 5 for the call to be routed through (network reference 50). A charging information field is then transmitted which includes a control reference number 51 which indicates to the appropriate network service provider that the operators of the control centre 7 need to be billed for the cost of the call. A customer identification field including customer reference number 52 is then sent which is forwarded to the control centre 7 so that the operator of the control centre may bill the user of the telephone 1. Finally the dialled number 53 is transmitted.

The "update routing tables" sub-routine 45 shown in FIG. 4 is employed when updating information is received via the receiving antenna 9 from the transmitting antenna 8.

Figure 7:
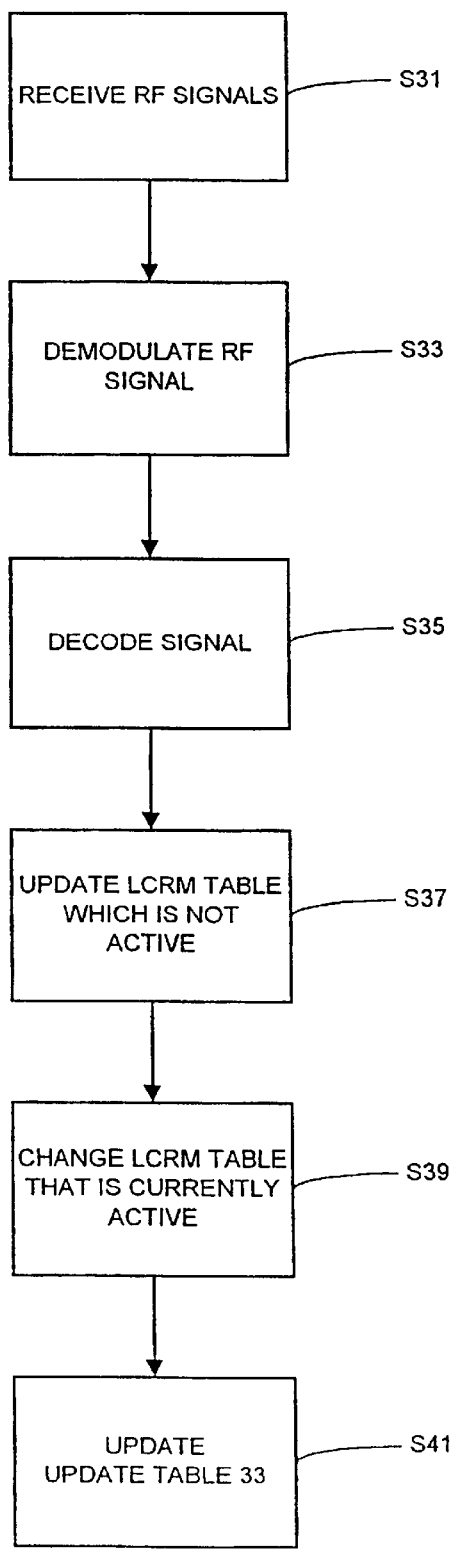
FIG. 7 is a flow chart indicating the sequence of events when the routing information in the routing device illustrated in FIG. 2 is updated.

The sequence of events when the routing information in an LCRM 3 is updated is shown in FIG. 7. In step S31, an RF signal transmitted by the transmitting antenna 8 is received via the receiving antenna 9. The demodulator demodulates the RF signal in step S33 to reproduce the coded signal. The protocol decoder 23 identifies that the signal contains updating information and decodes the coded data in step S35.

In step S37 the updated information is input into whichever one of the LCRM tables 31 and 31a is currently designated as being inactive. Then, at step S39, the designation of which LCRM table 31, 31a is currently active is reversed by the processor by changing the data stored in the active table 35.

The update table 33 is updated to record the time at which the LCRM table 31 has been last updated. If after a set period, in this embodiment 24 hours, the LCRM table 31 has not been updated then the processor 16 sends a signal to the LED 24 to start flashing.

The updating information may also include information to reset the clock 20 to the correct local time, day and date. This will ensure that all LCRM devices in the updating area are synchronised.

The monitor sub-routine 46 shown in FIG. 4 is used to monitor messages sent from the local exchange 4 to the LCRM 3. These messages may include information from the control centre 7 or information relating to the call status between the telephones 1, 2, or information to reset the clock 20.

The power to run the LCRM 3 may be received from the local exchange 4 via the plug 14a and lead 14 or alternatively the LCRM 3 may be powered by the power supply 27 or the conventional domestic electricity supply.

Although in this embodiment communication occurs between a telephone 1 and a telephone 2, the terminals may be any form of telecommunications apparatus, for example facsimile machines and computer modems, and combinations of telephones with radios, alarm clocks, answering machines and the like. Alternatively one or both of the terminals may be a private exchange such as private automatic branch exchange (PABX) or a network signal router.

Each telephone 1, 2 is connected to a local exchange 4, 6. In FIG. 1, only the telephones 1 are connected to a local exchange 4 via a respective LCRM 3. However, the telephones 2 may also be connected to a local exchange 6 via an LCRM. It is only necessary for the telephone 1 used for dialling to be connected to an LCRM 3.

In FIG. 1 the local exchanges 4, 6 are shown separate from the networks 5a, 5b, 5c. However, the local exchanges 4, 6 may also form part of a network.

Although in FIG. 1 only one transmitting antenna 8 is shown, in practice there may be many transmitting antennae covering different geographical areas. The control centre 7 may send different routing information to transmitting antennae 8 in different areas to allow for variations according to area for the cost of using each of the networks 5.

Preferably, the antenna 8 forms part of a network for transmitting information to pagers. Other suitable antennae 8 include those used for Digital Audio Broadcasting (DAB) and in the Global System for Mobile Communications (GSM) and the Radio Data System (RDS). In all these cases the least cost routing information may be transmitted at a time when the cost of transmitting is cheap, for example it is generally cheaper to transmit information at night.

It may in some circumstances not be essential to send the customer reference number 52 to the local exchange 4 if the local exchange 4 has the means to identify the telephone 1 of the caller, for example the Call Line Identifier (CLI) system. Alternatively, the means to identify the telephone 1 of the caller may be located in the networks 5a, 5b, 5c or the local exchange 6.

Rather than employing the 1xxx standard, the LCRM 3 could dial the number for a central routing unit and then transmit the routing information and the telephone number of the destination apparatus. The central routing unit is then able to route the call along the least cost route.

Preferably the telephone 1 employs dual-tone multi-frequency (DTMF) dialling. The tone generator subsequently generates a DTMF signal to be sent to the local exchange 4. The telephone 1 and the tone generator 21 may also employ pulse dialling. However, it would not be advantageous for the tone generator 21 to employ pulse dialling due do the time taken to send the signal to the local exchange 4. If the LCRM 3 is attached to a telephone 1 which employs pulse dialling, the tone generator may be used to generate DTMF dialling provided that this is compatible with the exchange.

It would be possible in an alternative embodiment to omit the location table 30 and to store in the LCRM routing information for every area code available as a call destination. However, it is advantageous to have a location table 30 as the amount of information which needs to be stored in the LCRM table 31 and subsequently updated may be reduced since a region with the same routing cost will frequently be larger than a region covered by an area code.

Similarly, the information stored in the network table 32 could be included in the LCRM table 31 and thus the need for the network table 32 obviated. However it is advantageous to have a network table 32 because it reduces the quantity of information that needs to be stored in the LCRM table 31 and updated.

Although in FIG. 2 the receiving antenna 9 is shown outside the housing 26 of the LCRM 3, the receiving antenna 9 may alternatively be located inside the housing 26 of the LCRM 3.

The LED 24 and the call progress monitor 25 in this embodiment may alternatively be omitted if simpler construction is desired. If the call progress monitor 25 is omitted, the registration number of the LCRM 3 and the frequency of the radio waves used for updating the LCRM table 31 may be input manually or received from the control centre 7 via the transmitting antenna 8 and the receiving antenna 9 on a preset frequency channel.

Although in this embodiment the control centre 7 is connected to the networks 5a, 5b, 5c via a local exchange 4 so that the networks 5a, 5b, 5c can transmit billing information to the control centre 7, alternatively the billing information may be sent by any other suitable link, for example a satellite link which does not form part of the networks 5a, 5b, 5c. Different networks 5a, 5b, 5c may send their billing information to the control centre 7 by different ways.

In this embodiment, if the network whose network reference is transmitted is unable to connect the call, the network reference of a reserve network is transmitted. Alternatively, the LCRM table 31 could store routing information indicating the least cost route and the next least cost route. If the network for the least cost route is unable to connect the call, the network with the next least cost route would be utilised. Similarly the LCRM table could store details of three or more networks. As another alternative, if the network whose network reference is transmitted is unable to connect the call, the LCRM 3 may transmit the dialled number directly to the local exchange 4 without providing routing information.

In this embodiment, the LCRM 3 buffers the entire number dialled at the telephone 1 in the RAM 19. However, the information required to determine the least cost route is contained in the first few digits of the dialled number. It is therefore possible that the connection via the least cost route may be established before a caller has finished dialling the number. In this case, it is possible to buffer the digits of the dialled number as they are input at the telephone 1 and, once the call has been connected to the network with the least cost route, transmit the digits of the dialled number buffered in the RAM 19 and then close the relay so that the remaining digits may go directly from the telephone 1 via the socket 13, the relay 17, the lead 14 and the plug 14a to the local exchange 4.

A second embodiment of the present invention will now be described. In this embodiment rather than having a separate LCRM apparatus 3 as in embodiment 1, the function of the LCRM 3 is incorporated into a telephone. Such an arrangement is shown schematically in FIG. 10 in which a telephone 102 incorporates routing apparatus 104. Similarly as shown in FIG. 11, the routing device 104 may be unitarily formed in a facsimile machine 103.

Figure 8:
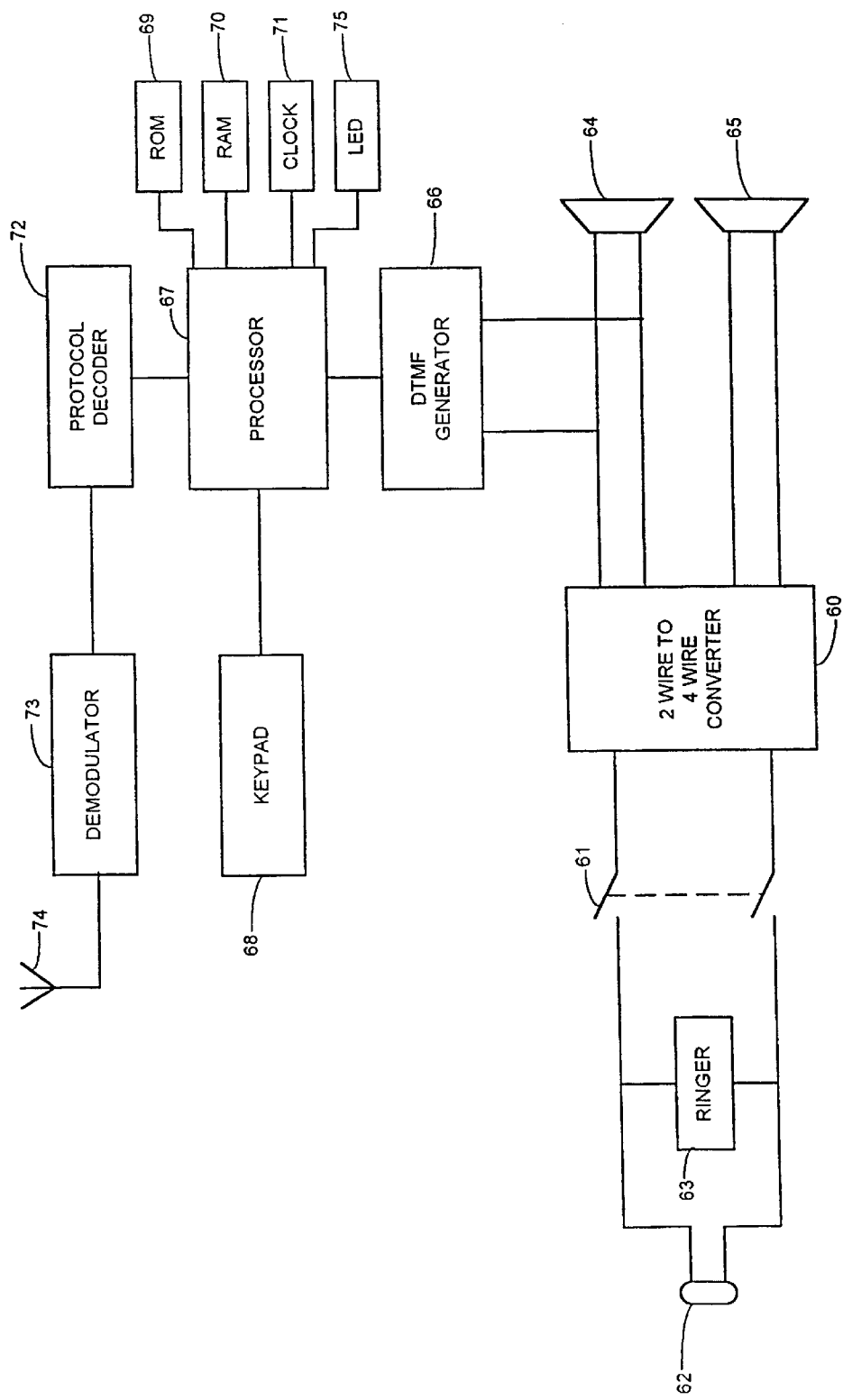
FIG. 8 is a block diagram of a routing device incorporated into a telephone according to a second embodiment of the present invention.
Figure 9:
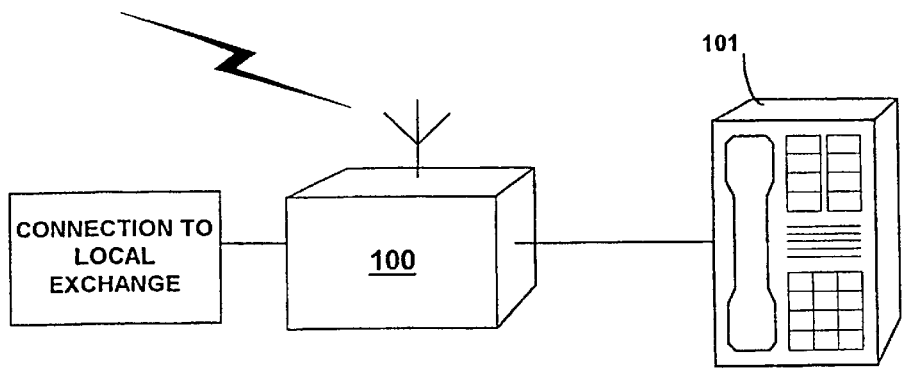
FIG. 9 is a schematic representation of a stand alone routing device connected to a conventional telephone.

As shown in FIG. 8, the telephone apparatus according to a second embodiment of the invention comprises a two wire to four wire converter 60. The two wire input side of the two wire to four wire converter 60 is connected to a telephone socket 62 via an off-hook switch 61. On the telephone socket 62 side of the off-hook switch 61, a ringer 63 is positioned between the two wires. The contacts of the off-hook switch 61 are closed when the handset is picked up for use.

On the four wire side of the two wire to four wire converter 60, two wires are connected to a microphone 64 and two wires are connected to an ear piece 65. A DTMF generator 66 is also connected to the two wire to four wire converter 60 in parallel with the microphone 64. The DTMF generator 66 is also connected to an output of a processor 67. The processor 67 is connected to a keypad 68, a ROM 69, a RAM 70, a clock 71 and an LED 75. An input of the processor 67 is also connected to a protocol decoder 72, which is connected to a demodulator 73 which is connected to a receiving antenna 74.

Figure 10:
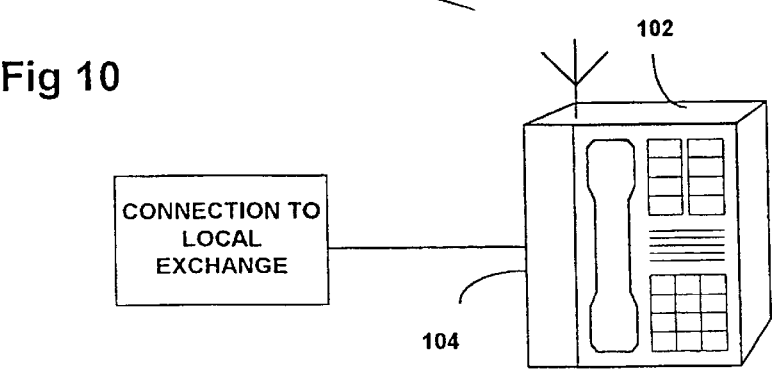
FIG. 10 is a schematic representation of a telephone and routing device formed unitarily within a single housing.
Figure 11:
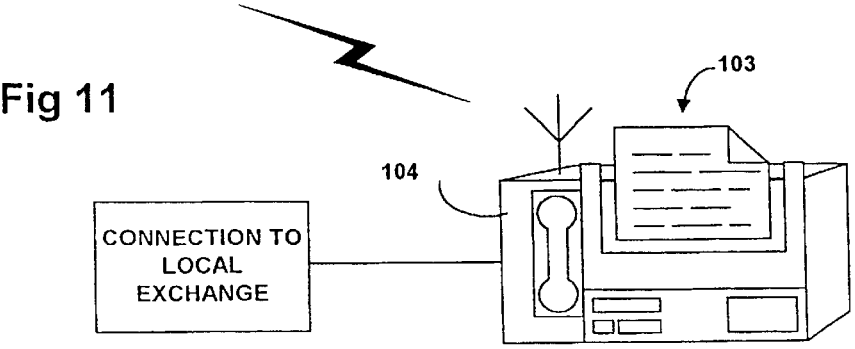
FIG. 11 is a schematic representation of a facsimile machine and a routing device formed unitarily in a common housing.

As shown schematically, in FIGS. 10 and 11, the telephone or facsimile apparatus 102, 103 having a circuit shown in FIG. 8 may replace a telephone 1 connected to an LCRM 3 in the communication system shown in FIG. 1.

When a caller picks up the telephone, the off-hook switch 61 connects the two wire to four wire converter 60 to the telephone socket 62. The caller then inputs the telephone number of the telephone he desires to call at the keypad 68 which sends this information to the processor 67. The processor 67 identifies the least cost route to the destination telephone and sends dialling information for the location of the telephone and the least cost route to the DTMF generator 66. The DTMF generator 66 then transmits this information to a local exchange via the telephone socket 62.

The function of RAM 70, clock 71 and LED 75 is substantially identical to that of the corresponding features in embodiment 1. The protocol decoder 72, demodulator 73 and receiving antenna 74 also have substantially identical functions to the corresponding features in embodiment 1.

The programs stored in the ROM 69 are substantially the same as the programs stored in the ROM 18 in the first embodiment, as shown in FIG. 4 except for the monitor sub-routine which is no longer present and the system manager program. The system manager program controls the telecommunication apparatus and is therefore different from the system manager program of the LCRM 3 in the first embodiment.

The routine for updating the routing information is identical to that in the first embodiment, as shown in FIG. 7.

The ringer 63 is to enable a signal to be made when a call is received from another telephone.

The keypad 68 for inputting dialling information is connected to the processor 67. Although in this embodiment a keypad 68 is used, any method for inputting dialling information, for example a voice recognition system may be employed. The processor 67 is connected to a DTMF generator 66 for generating dialling information signals to be sent to a local exchange. The microphone 64 and the earpiece 65 are used for inputting sound to be transmitted and receiving sound transmitted from the dialled telephone respectively.

Although in this embodiment a two wire to four wire converter 60 is used, the invention may be applied equally to telephones incorporating other circuits.

In the second embodiment, a telephone has an in-built least cost routing module. Similarly, least cost routing modules could be incorporated into other telecommunication apparatus such as facsimile machines, modems and PABXs. A routing device incorporated into a facsimile machine is illustrated schematically in FIG. 11.

A DTMF detector may be additionally added to the telephone apparatus of the second embodiment, connected in parallel with the ear piece 65. In this way information can be sent to the processor along the telephone line. An example of information which may be sent in this way is the telephone number of a telecommunications apparatus which has been used to call the telephone apparatus of the second embodiment or information required to initialise the telephone apparatus.

A sub-routine with substantially the same functions as that of the monitor sub-routine 46 in the first embodiment may be added in addition to the DTMF detector so that the processes outlined in the first embodiment in relation to the monitor sub-routine 46 may be employed.

The earpiece 65 may be replaced by a loudspeaker, for example in a telephone apparatus which has "hands-free" capability.

Figure 12:
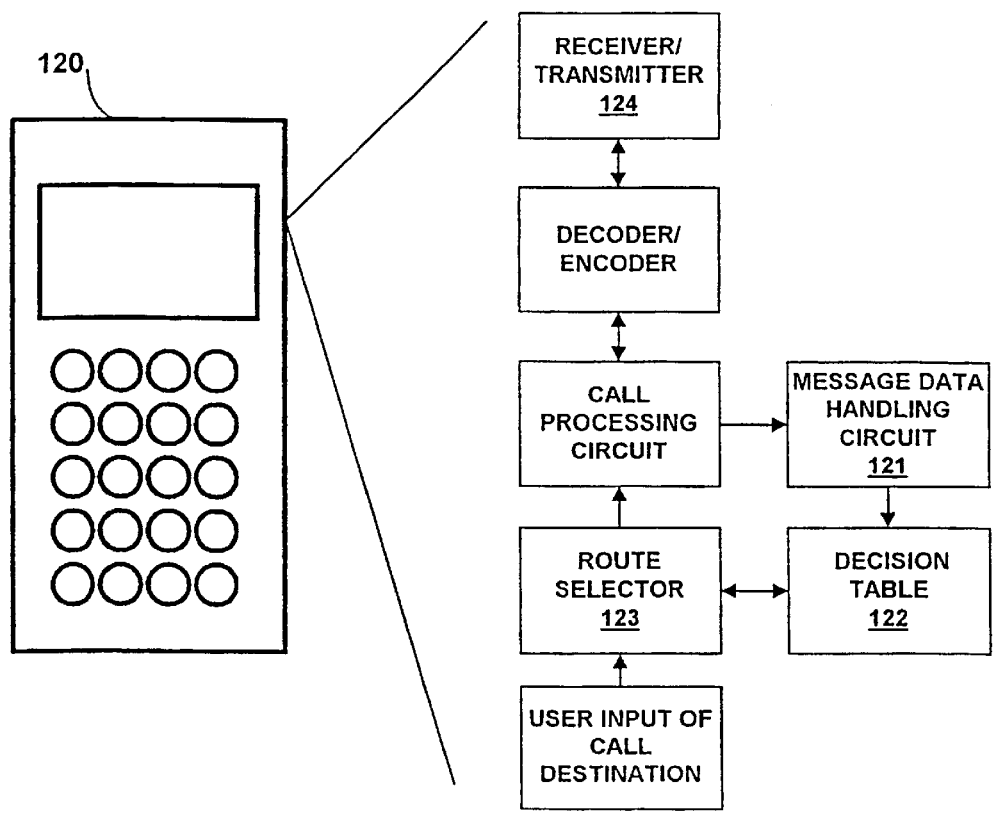
FIG. 12 is a schematic representation of a mobile cellular phone together with a schematic flowchart representation of the operational elements thereof.

A third embodiment of the present invention will now be described with reference to FIG. 12. In this embodiment the function of the LCRM 3 is incorporated into a mobile cellular telephone 120.

In this embodiment, the mobile telephone forms part of the GSM network. It is a conventional GSM mobile telephone with the addition of routing features substantially as described in the second embodiment. In the GSM system, there is a service named Cell Broadcast.

The Cell Broadcast service enables short messages to be sent to all telephones in a geographical area.

In this embodiment, the Cell Broadcast service is used to send updating information for updating the least cost route tables stored in the mobile telephone. This is illustrated schematically in the right hand portion of FIG. 12 which illustrates that the message data handling circuit 121 of the mobile phone 120 is used to input data to a decision table 122 corresponding functionally to the LCRM tables 31 and 31a referred to above. The processor of the mobile phone 120 includes a route selector 123 which refers to the decision table 122 before processing a user input call destination to enable an appropriate prefix to be added to the user dialled number. In the mobile telephone 120, the receiver 124 which is provided for receiving radio transmissions of telephone calls also serves to receive the message data input to the message data handling circuit 121.

The mobile telephone apparatus may replace a telephone 1 connected to an LCRM 3 in the communication system shown in FIG. 1. The local exchange 4 shown in FIG. 1 will be either the nearest base station of the mobile telephone network or a routing station to which a number of base stations of the mobile telephone network are connected.

It will be appreciated that the teaching of this embodiment may be applied to other GSM-based mobile telephone networks or Code Division Multiple Access (CDMA) based networks. An example of a suitable mobile phone network is the Personal Handyphone System (PHS).

Figure 13:
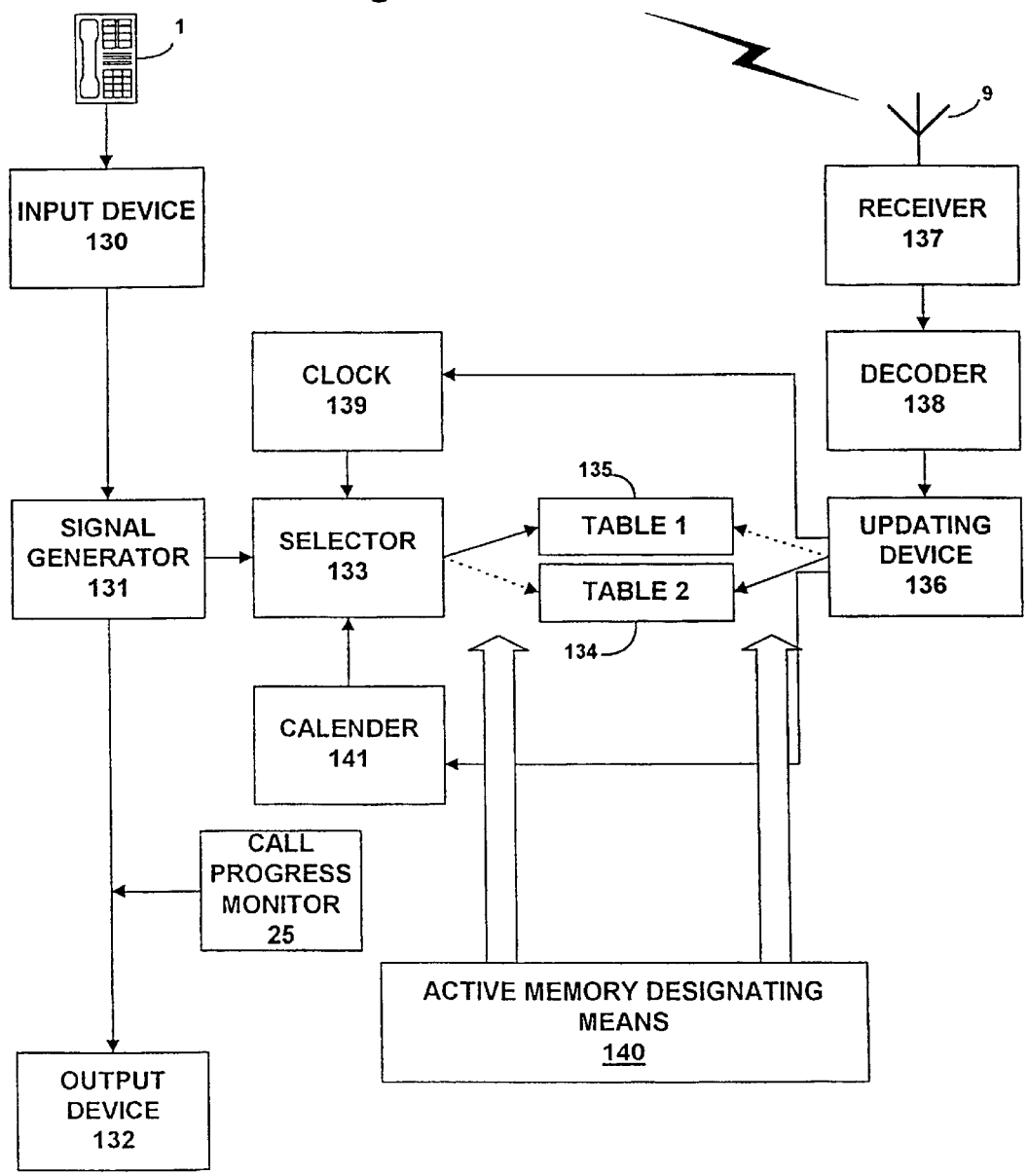
FIG. 13 is a schematic representation of the operational elements of a routing device of the type referred to in FIGS. 9 to 11.

FIG. 13 illustrates schematically a generalised routing device in accordance with the present invention. An input device 130 receives an input signal representative of a user generated call number which defines the user selected call destination. A signal generator 131 prefixes the input signal with a prefix signal which is representative of a selected prefix code defining the preferred network connection route and including other data relating to customer identification and charging.

An output device 132 outputs an output signal which consists of the input signal prefixed by the prefix signal to the local exchange (or cellular phone service provider in the case of a mobile phone).

A selector 133 obtains the selected prefix code by addressing a decision table 134 or 135, depending upon which of the decision tables is currently active, the address information including call destination data, time period data, and day of the week data from a calendar 141. An updating device 136 updates whichever of the decision tables 134 and 135 is currently inactive and receives updating information from a receiver 137 and a decoder 138.

A clock 139 and the calendar 141 are also updated by the received broadcast information via the receiver 137 for providing the additional address information for the selector 133 in addressing the look up tables 134 and 135.

The active memory is designated by a designating means 140, depending upon whichever of the tables 134 and 135 has been most recently updated. A call progress monitor 25 monitors whether the call has been connected in accordance with the output signal from the output device 132 and, if no connection has been possible, prompts the signal generator 131 to generate an alternative, default output signal to a different network connection route.

Figure 14:
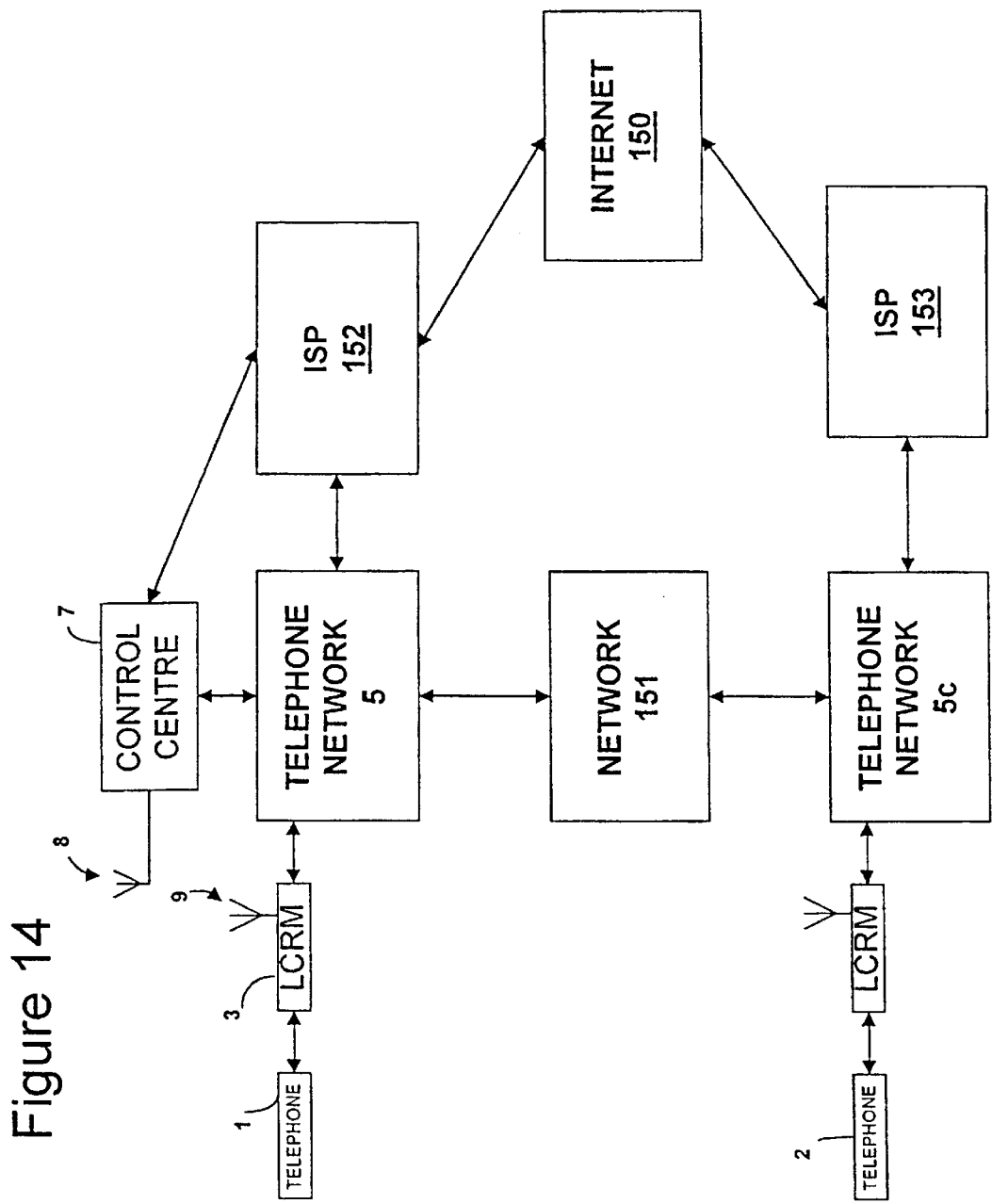
FIG. 14 is a schematic illustration of the use of the Internet in conjunction with a routing device in accordance with the present invention.

FIG. 14 illustrates a further alternative system incorporating a routing device 3 where the available routes for connection between telephones 1 and 2 include a packet network such as the Internet 150. The telephone 1 and routing device 3 are connected to telephone network 5 in the manner described above and connection between telephones 1 and 2 may be made via any one of a number of available network connection facilities 151. An Internet service provider 152 connected to the telephone network 5 may be the selected route to receive a call from telephone 1 and in response to receipt of such a call, the ISP (Internet Service Provider) 152 establishes connection with a second ISP 153 via the Internet.

Transmission of the telephone call between the first and second ISP's 152 and 153 requires use of the Internet protocol, the telephone signal being digitized and subject to fragmentation for packet communication as datagrams which are reassembled in the second Internet Service Provider 153 and reconstituted as telephone signals for forwarding to the telephone 2 via telephone network 5A.

Establishing connection via this route requires the routing device 3 to prefix the dialled number with a telephone number of the first ISP 152, in addition to any other routing information which may be required.

Customer dial records generated by the ISP 152 are passed to the control centre 7 for billing. It is envisaged that use of the Internet or other public or private data networks may prove to be the preferred route for certain long distance telephone calls, particularly when on-going improvements in Internet and data networks performance are implemented.

In the previous embodiments the term "off-hook" is used to signify that a telecommunication apparatus is in use.

In the previous embodiments, the least cost information calculated at the control centre 7 is transmitted by a transmitting antenna 8 using radio waves. However, the least cost information may be transmitted using free-space electromagnetic waves in other regions of the electromagnetic spectrum, including the infra-red.

Although in the previous embodiments a call has been routed along the least cost route, the least cost route is not in all cases the most preferable. For example, the preferred route may be via the network connection for reliability, quality of signal or connection capacity are optimum. The control centre may collate and send routing information based on any criteria for preferability.

A routing device as described in the first embodiment can in an alternative embodiment (not shown) be made with a plurality of operating modes which are accessible by a user. A user could set the routing device to 'least cost' mode when it is attached to a telephone or to a 'maximum bandwidth' mode when it is attached to a computer modem.

In a further embodiment of the invention, not illustrated, a route selection apparatus is provided for a computer equipped with a modem by providing a broadcast receiver associable with the processor of the computer, and installing software in the computer memory to provide memory means to store route information, selection means to select the preferred route and to provide routing information to the computer's modem when a call is to be made, the stored route information recorded in the memory of the computer being updated in response to an updating signal received by the broadcast receiving means. In such an implementation, the processor of the computer will fulfil the functions of the processor 16 described in the first embodiment of the invention, and the random access memory and hard disc memory of the computer will provide the necessary data storage facilities. The broadcast receiver is preferably a radio receiver, and may be mounted within the housing of the computer or may be an ancillary device connected to the computer via a connection port. It is envisaged that the broadcast receiving means and programming software for the computer could be sold as a kit.

Optionally, in all the embodiments, an additional table may be stored in the RAM storing calender information so that information relating to the day of the week or public holidays may be separately stored. This information may then form part of the address used in addressing the look up table containing routing information.

In the first and second embodiments, the updating information is preferably transmitted via a network for transmitting information to pagers. Other suitable transmitters include those used for DAB, and in the GSM and RDS networks. In all these cases the least cost routing information may be transmitted at a time when the cost of transmitting is cheap, for example at night.

The routing information may be updated at any time but would preferably be updated either at regular intervals, preferably between one day and one month, or whenever the preferential routing information changes.

What is claimed is:

1. Apparatus for routing telephone calls comprising:

input means operable to receive an input signal representative of a user generated call number defining a user selected call destination;

signal generating means operable to prefix the input signal with a prefix signal representative of a selected prefix code defining at least a network connection route selected from a plurality of available routes to the user selected call destination;

memory means operable to store a decision table containing predetermined data for determining prefix codes corresponding to a plurality of respective call destinations;

selecting means operable to obtain said selected prefix code corresponding to said user selected call destination by addressing the memory means;

output means operable to output an output signal corresponding to the input signal prefixed by the prefix signal;

receiving means operable to receive a wireless broadcast signal of updating information; and updating means operable to update the predetermined data stored in the decision table in accordance with the received updating information, wherein the updating means is operable to update the predetermined data in the decision table with updating information comprising network ID data identifying for a respective call destination a preferred route calculated by a control center from which the updating information is broadcast in use, and wherein the memory means further comprises a network table for obtaining the prefix code from the network ID.

2. Apparatus as claimed in claim 1 wherein the updating information comprises a set of updated predetermined data defining an updated decision table.

3. Apparatus as claimed in claim 1 wherein the broadcast signal is a radio signal, and the receiving means includes an antenna and receiving circuitry.

4. Apparatus as claimed in claim 1 wherein the memory means includes first and second memory areas operable to store respective first and second decision tables, the apparatus further comprising designating means operable to selectively designate only one of said first and second memory areas as an active memory addressable by the selecting means and to designate the remaining one of the memory areas as an inactive memory which is non-addressable by the selecting means, whereby the selecting means is operable to address the decision table in the active memory and the updating means is operable to update the predetermined data stored in the inactive memory, and wherein the designating means is operable to designate as the active memory the memory area for which updating has most recently been completed.

5. Apparatus as claimed in claim 1 wherein the memory means is further addressable with time period data representative of a time period within which the input signal is received, whereby for each call destination the predetermined data defines a plurality of prefix codes corresponding to a plurality of respective time periods.

6. Apparatus as claimed in claim 5 further comprising clock means operable to provide said time period data to the selection means according to current local time.

7. Apparatus as claimed in claim 6 wherein the updating information includes clock resetting data and wherein the apparatus comprises clock resetting means operable to reset the clock means.

8. Apparatus as claimed in claim 1, comprising means for determining the user selected call destination used by the selecting means in addressing the decision table based on the first received digits of the user generated call number.

9. Apparatus as claimed in claim 8, wherein the input means is arranged to store the sequentially received user generated call number digit by digit in a buffer until the selection means has selected the selected prefix code on the basis of the first received digits and until the output means has output an initial portion of the output signal representative of both the prefix code and the stored first received digits, the output means being thereafter operable to output a remaining portion of the output signal representative of sequentially received further digits of the user generated call number without said further digits being stored in the buffer.

10. Apparatus as claimed in claim 1, wherein the input means is operable to store all of the digits of the sequentially received user generated call number in a buffer while the selection means selects the selected prefix code, and the output means is operable thereafter to output the output signal.

11. Apparatus as claimed in claim 1 wherein the prefix code includes a customer identification field containing user specific identification data.

12. Apparatus as claimed in claim 1 wherein the prefix code includes a charging information field containing charging information for identifying a control entity to be billed by a network provider corresponding to the selected network connection route.

13. Apparatus as claimed in claim 1 wherein said input means comprises connection means for connection via an external cable to at least one of a telephone and a facsimile machine to receive said input signal therefrom.

14. Apparatus as claimed in claim 1 formed unitarily with a telephone set.

15. Apparatus as claimed in claim 1 formed unitarily with a facsimile device.

16. Apparatus as claimed in claim 1 wherein said receiving means comprises decoding means operable to decode broadcast signals from a pager system transmitter.

17. Apparatus as claimed in claim 16 wherein the receiving means and decoding means are responsive to radio pager transmissions in accordance with the POCSAG standard.

18. Apparatus as claimed in claim 1 formed unitarily with a mobile cellular telephone.

19. Apparatus as claimed in claim 18 wherein the receiver is constituted by a receiving circuit of the mobile cellular telephone which further comprises a message handling circuit operable to receive updating information via a message broadcast facility of a cellular telephone system in which the mobile cellular telephone is operable.

20. Apparatus as claimed in claim 1 comprising detecting means operable to detect whether connection to the user selected call destination has been possible via the selected network connection route in response to the output signal, and default means operable when such connection is detected not to be possible to output a default output signal defining a default route to the user selected call destination.

21. Apparatus as claimed in claim 1 wherein the predetermined data defines network ID data calculated by the control center to provide network connection at minimum cost.

22. A method of controlling routing of telephone calls comprising:
    collecting route information from a plurality of service providers having respective network connection facilities;
    compiling a set of preferred routes between call originating terminals and call destinations based on the collected route information;
    preparing for a group of user terminals in a common geographical area a set of predetermined prefix codes for use in prefixing user generated call numbers to define the preferred network connection routes;
    broadcasting to the routing apparatus associated with said terminals the predetermined data by means of a wireless broadcast signal;
    storing the predetermined data in the routing apparatus, and operating the terminals and the routing apparatus in accordance with the predetermined data to make telephone connection between the terminals and the call destinations via the preferred route,
    wherein the predetermined data prepared at the control center and broadcast to the routing apparatus comprises network ID data identifying for a respective call destination a preferred route calculated by the control center, and
    wherein the routing apparatus obtains a prefix code for routing the telephone connection by using a network table to obtain the prefix code from the network ID.

23. A method as claimed in claim 22 wherein the preferred routes are determined on the basis of least cost.

24. A method as claimed in claim 22 wherein the wireless broadcast signal is broadcast by a radio pager transmitter, including the step of updating the stored predetermined data by a transmission from the radio pager transmission at a time when pager transmission traffic is off peak.

25. A method as claimed in claim 22 wherein at least one of said service providers is an Internet service provider having Internet connection facilities and wherein at least one of said predetermined prefix codes defines a network connection route via the Internet.

26. A control center for use in controlling the routing of telephone calls comprising:
    means for collecting route information from a plurality of service providers having respective network connection facilities;
    means for compiling a set of preferred routes between call originating terminals and call destinations based on the collected route information;
    means for preparing a set of predetermined data for a group of user terminals in a common geographical area for use in prefixing user generated call numbers to define the preferred network connection routes; and
    means for broadcasting to the routing apparatus associated with said terminals the predetermined data by means of a wireless broadcast signal, wherein the control center prepares the predetermined data in the form of network ID data identifying for a respective call destination a preferred route calculated by the control center on the basis of the collected route information.

27. A method of routing telephone calls, comprising:

inputting, to a routing apparatus, an input signal representative of a user generated call number defining a user selected call destination;

selecting a prefix code corresponding to said user selected call destination by addressing a memory means storing a decision table containing predetermined data for determining prefix codes corresponding to a plurality of respective call destinations;

generating a prefix signal representative of the selected prefix code defining at least a network connection route selected from a plurality of available routes to the user selected call destination and prefixing the input signal with the prefix signal;

outputting an output signal corresponding to the input signal prefixed by the prefix signal, the routing apparatus further receiving a wireless broadcast signal of updating information comprising updated prefix codes and updating the predetermined data stored in the decision table with the received updated prefix codes.

28. A mobile telephone comprising apparatus for determining preferred network routing of telephone calls made using the mobile telephone, wherein the apparatus comprises:

input means operable to receive an input signal representative of a user generated call number defining a user selected call destination;

signal generating means operable to prefix the input signal with a prefix signal representative of a selected prefix code defining at least a network connection route selected from a plurality of available routes to the user selected call destination;

memory means operable to store a decision table containing predetermined data for determining prefix codes corresponding to a plurality of respective call destinations;

selecting means operable to obtain said selected prefix code corresponding to said user selected call destination by addressing the memory means;

output means operable to output an output signal corresponding to the input signal prefixed by the prefix signal;

receiving means operable to receive a wireless broadcast signal of updating information; and updating means operable to update the predetermined data stored in the decision table in accordance with the received updating information.

29. A mobile telephone as claimed in claim 28, wherein the receiver is constituted by a receiving circuit of the mobile cellular telephone which further comprises a message handling circuit operable to receive updating information via a message broadcast facility of a cellular telephone system in which the mobile cellular telephone is operable.

30. A computer program comprising processor implementable instructions for controlling a processor of a routing apparatus to perform a method comprising:

inputting, to the routing apparatus, an input signal representative of a user generated call number defining a user selected call destination;

selecting a prefix code corresponding to said user selected call destination by addressing a memory means storing a decision table containing predetermined data for determining prefix codes corresponding to a plurality of respective call destinations;

generating a prefix signal representative of the selected prefix code defining at least a network connection route selected from a plurality of available routes to the user selected call destination and prefixing the input signal with the prefix signal;

outputting an output signal corresponding to the input signal prefixed by the prefix signal; and updating the predetermined data stored in the decision table with updated prefix codes received by the routing apparatus in a wireless broadcast signal of updating information comprising said updated prefix codes.

* * * * *